(12) United States Patent
Shiinoki et al.

(10) Patent No.: US 6,193,486 B1
(45) Date of Patent: Feb. 27, 2001

(54) PACKAGE-TYPE SCROLL COMPRESSOR (75) Inventors: Kazuaki Shiinoki; Akira Suzuki; Isamu Kawano; Natsuki Kawabata, all of Shimizu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/272,373

(22) Filed: Mar. 19, 1999

(30) Foreign Application Priority Data

Mar. 19, 1998 (JP) .................................................. 10-069795

(51) Int. Cl.⁷ ...................................................... F01C 1/02
(52) U.S. Cl. ........................... 418/55.1; 418/101; 418/83; 62/95; 62/272; 62/323.1
(58) Field of Search .................................. 418/55.1, 101, 418/83; 62/93, 95, 272, 323.1

(56) References Cited

U.S. PATENT DOCUMENTS

| | | | |
|---|---|---|---|
| 4,918,939 | * 4/1990 | Fresch et al. | 62/272 |
| 5,228,309 | * 7/1993 | McCullough | 62/323.1 |
| 5,358,387 | 10/1994 | Suzuki et al. | . |
| 5,690,480 | 11/1997 | Suzuki et al. | . |
| 5,755,564 | 5/1998 | Machida et al. | . |
| 5,961,297 | * 11/1999 | Haga et al. | 417/310 |
| 5,983,651 | * 11/1999 | Huang | 62/152 |

FOREIGN PATENT DOCUMENTS

| | | | |
|---|---|---|---|
| 0863313 | * 9/1998 | (EP) | 418/55.1 |
| 406129383 | * 5/1994 | (JP) | 418/101 |
| 406249165 | * 9/1994 | (JP) | 418/101 |
| 8-219067 | 8/1996 | (JP) | . |
| 8-261180 | 10/1996 | (JP) | . |
| 407158582 | * 9/1998 | (JP) | 418/101 |
| 5885390 | * 9/1998 | (JP) | 418/101 |

OTHER PUBLICATIONS

U.S. application No. 09/921,798, filed Sep. 2, 1997, pending.
U.S. application No. 09/024,563, filed Feb. 17, 1998, pending.

* cited by examiner

*Primary Examiner*—Thomas Denion
*Assistant Examiner*—Thai-Ba Trieu
(74) *Attorney, Agent, or Firm*—Evenson, McKeown, Edwards & Lenahan, P.L.L.C.

(57) ABSTRACT

It is an improvement of a package-type compressor that is used for the air compression, refrigerating and air conditioning.

The compressor is a double scroll compressor that a laps are formed on both sides of an end plate of orbiting scroll. A scroll compressor element is disposed above a motor and a dryer is disposed further above the scroll compressor element. A cooling fan is installed in the motor. A cooler that cools operation gas through the compressor element is disposed above the cooling fan.

A partition plate defines a first flow passage for cooling the motor and the compressor element and a second flow passage for cooling the cooler.

A first suction port sucking external air to the first and second flow passages is provided on a casing side wall locating in a direction extending from the motor shaft. A suction partitioning plate is attached to a casing side wall opposite to the casing side wall having the first suction port. The second suction port is lower than the first suction port.

12 Claims, 7 Drawing Sheets

PACKAGE-TYPE SCROLL COMPRESSOR

BACKGROUND OF THE INVENTION

This invention relates to a package-type compressor of the type used for air compression, refrigeration and air-conditioning, etc., and more particularly to a package-type compressor using an oil-free scroll compressor element. An oil-free scroll compressor, which does not use oil such as a lubricating oil for the flow passage of the operation gas, is a well known compressor for use in air compression, refrigeration, and air-conditioning.

In this oil-free scroll compressor, two sealed spaces are defined by laps and end plates on the outer wall surface of an orbiting scroll lap and a stationary scroll lap by combining the orbiting scroll and the stationary scroll, each of which is equipped with spiral laps perpendicular to an end plate, while the inside of the laps face one another.

The sealed spaces move towards the center portion due to the relative motion of both scrolls. As their volumes thus decrease, a gas sucked from the outer peripheral sides of these scrolls is compressed and is discharged from a discharge port disposed at the center portion of the stationary scroll. When the operation gas is compressed in this way by the relative motion of the orbiting scroll and the stationary scroll, the scroll compressor generates heat. A discharge temperature of the operation gas reaches to about 190 to about 240° C.

To increase a capacity of compressor, the scroll compressor element which is so-called a double scroll compressor, is proposed recently. The double scroll compressor has scroll laps on both sides of the end plate of the orbiting scroll.

It is impossible to use one side of the end plate of the orbiting scroll for cooling in case of the double scroll, as the conventional scroll compressor is possible. Therefore, cooling holes are formed through the end plate of the orbiting scroll of the double scroll. An example of such a system is described in Japanese Patent Laid-open No. 8-219067/1996 and Japanese Patent Laid-open No. 8-261180/1996.

Though it is considered how to cool the compressor element itself in these publication, it does not take into consideration of cooling the whole compressor when it is packaged. That is, the double scroll compressor element applied to the package-type compressor generates vast heat compared with a conventional scroll compressor elements at the center of the orbiting scroll.

It is, therefore, needed to use a cooling air sucked from outside of a casing of the package-type compressor effectively. To cool the compressor effectively, a flow rate of a blow gas to the compressor has been increased until now. According to this technique, however, the cooling effect has not improved by increasing the blow gas on the double scroll compressor, because an area for cooling is restricted owing to a presence of scroll laps on both side of the orbiting scroll.

A noise caused by a cooling gas flow increases, when the blow gas flow rate has increased to get more effective cooling. Further, a bad influence has increased on a circumstance around the casing of the compressor by a hot air discharged from the package-type compressor after cooling. Therefore, it costs much for soundproofing and discharging exhaust gas after cooling to a place far away.

BRIEF SUMMARY OF THE INVENTION

It is therefore a main object of the present invention to achieve a low noise package-type scroll compressor which can eliminate the problems described above. It is another object of the present invention to achieve a package-type scroll compressor which does not need a large installing space. It is still another object of the present invention to achieve a package-type scroll compressor having a big capacity which improves reliability of the scroll compressor with increasing cooling effect.

A package-type scroll compressor of the type to which invention applies, comprises a scroll compressor element having an orbiting scroll which has scroll laps on both sides of an end plate and two stationary scrolls each of which has a scroll lap meshing the scroll lap of the orbiting scroll and forming a compression chamber with the scroll lap of the orbiting scroll respectively; a motor for driving the scroll compressor element; a cooler for cooling an operation gas compressed in the scroll compressor element; a cooling fan disposed on one end of the motor for blasting cooling air subjected to heat-exchange with the operation gas by the cooler; and a casing for accommodating these members.

A first embodiment of the present invention for accomplishing the objects described above employs a construction wherein the scroll compressor element is disposed above the motor, a dryer for drying the operation gas cooled in the cooler is disposed further above the scroll compressor element, through-holes for cooling are formed in the end plate of the orbiting scroll, cooling passages for cooling the scroll compressor element communicating the through-holes are formed in the scroll compressor element, and the cooling passages are arranged vertically.

Preferably, this cooler is disposed above the cooling fan, or the dryer provides a refrigeration cycle of a heat pump type. A second embodiment of the present invention for accomplishing the objects described above employs a construction wherein the package-type scroll compressor provides a partition wall for partitioning a first flow passage of the cooling air for cooling the scroll compressor element and the motor, and a second flow passage of the cooling air for cooling the cooler.

Preferably, the cooling fan blows cooling air to both the first flow passage and the second flow passage; a suction partition wall is provided at the casing where the cooling fan is disposed, a first opening is formed on the suction partition wall facing to the cooling fan, and a second opening which introduces air from inside of the casing, is formed at the different portion of the suction partition wall where the first opening is formed; a suction port which introduces the cooling air to the first and the second flow passages, is provided at the partition wall opposite to the cooling fan; or the dryer is disposed above the scroll compressor element, the suction port is formed at the casing facing to the dryer, the discharge port is formed at a top of the casing, and a third flow passage is formed in the compressor to suck a peripheral air from the suction port and to discharge the sucked air from the discharge port.

More preferably, the discharge port is formed at the top of the partition wall to discharge the cooling air passed through the first and the second flow passage outside of the compressor.

Further, a rotor shaft of the motor and a driving shaft of the scroll compressor element may be in parallel; a plurality of fins may be formed on the both side of the scroll compressor element and the fins may be substantially in parallel with the through-holes formed inside of the end plate of the orbiting scroll; or a suction space may be juxtaposed to an axial end of the cooling fan. A third embodiment of the present invention for accomplishing the objects described above employs a construction wherein a partitioning means which separates the first flow passage for cooling the scroll compressor element and the motor and the second flow passage for cooling the cooler is formed between the cooler and the cooling fan.

In a package-type scroll compressor of the type wherein a scroll compressor element having an orbiting scroll which has scroll laps on both sides of an end plate and two stationary scrolls each of which has a scroll lap meshing the scroll lap of the orbiting scroll and forming a compression chamber with the scroll lap of the orbiting scroll respectively; a motor for driving the scroll compressor element; a cooler for cooling an operation gas compressed in the scroll compressor element; a cooling fan disposed on one end of the motor for blasting a cooling air to the cooler; and a casing for accommodating these members.

A fourth embodiment of the present invention for accomplishing the objects described above employs a construction wherein an air intake is formed at a casing side wall which locates on an extending point of the scroll compressor element, a suction partitioning means which parts the suction space of the cooling fan is disposed on the casing wall opposed to the air intake, the suction partitioning means has a cooling air intake from which an air delivered from the cooling fan is sucked, and the cooling air intake is lower than the air intake.

According to the present invention having the construction described above, the following results will be derived. As the cooler is arranged in a discharge side of the cooling fan, a duct is connected to the one of the air suction side of the cooling fan, the cooling air intake in the compressor is disposed at the other air suction side, and the scroll compressor element is located upstream in the duct, the cooling air flowing through the scroll compressor element is discharged from the discharge port disposed at the top of the casing, sucked from one of the suction side of the cooling fan.

Since the air flowing through the casing is sucked from the other suction side of the cooling fan and goes into the cooler, the cooler is cooled by the air outside of the compressor, cooling efficiency can be improved and the air flow rate for cooling can be reduced. As a result, the discharge flow rate of the cooling air can be reduced, and the noise at the compressor becomes low.

DETAILED DESCRIPTION OF THE INVENTION

Figure 1:
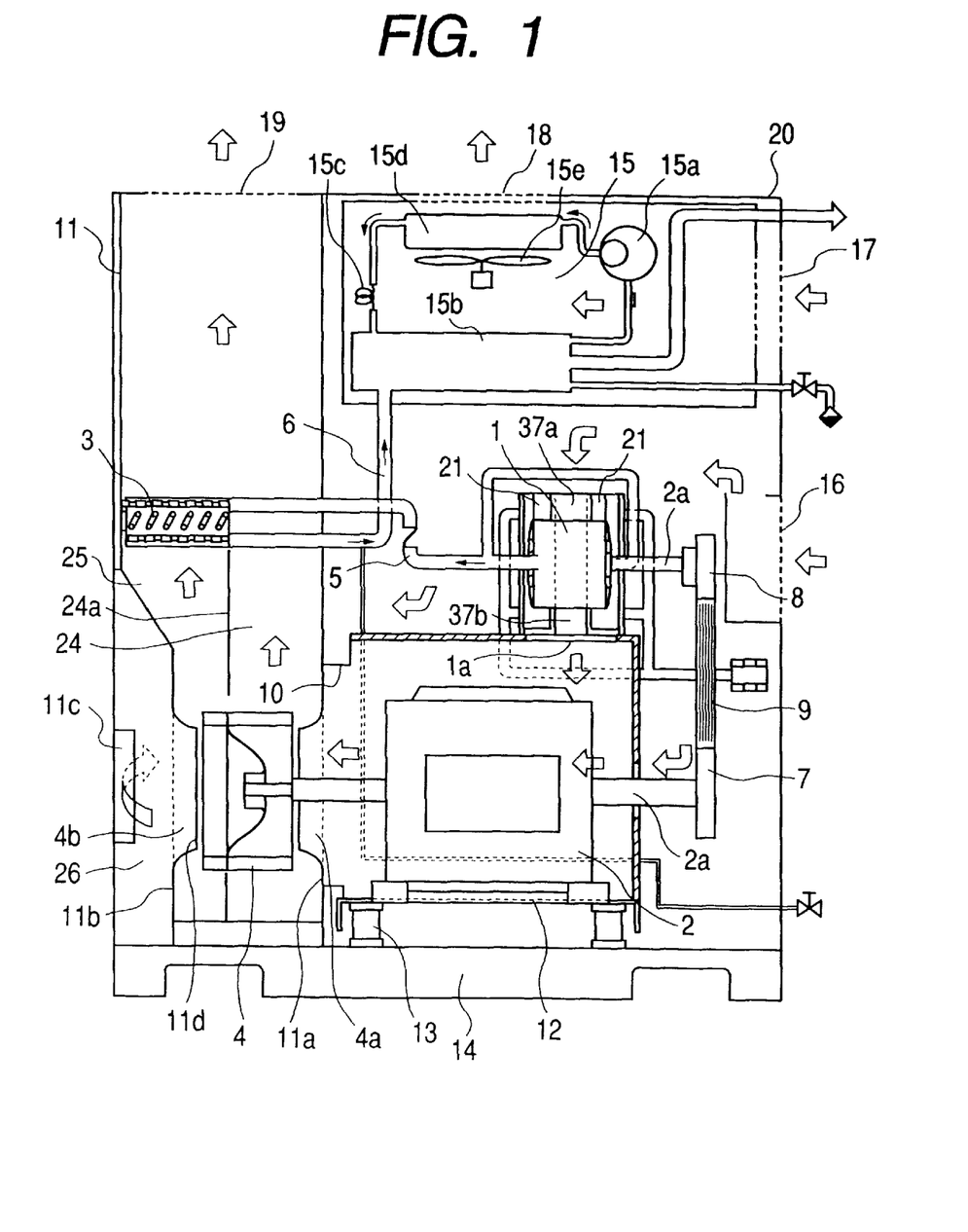
FIG. 1 show an package-type scroll compressor according to an embodiment of the present invention describing an air flow path.
Figure 2:
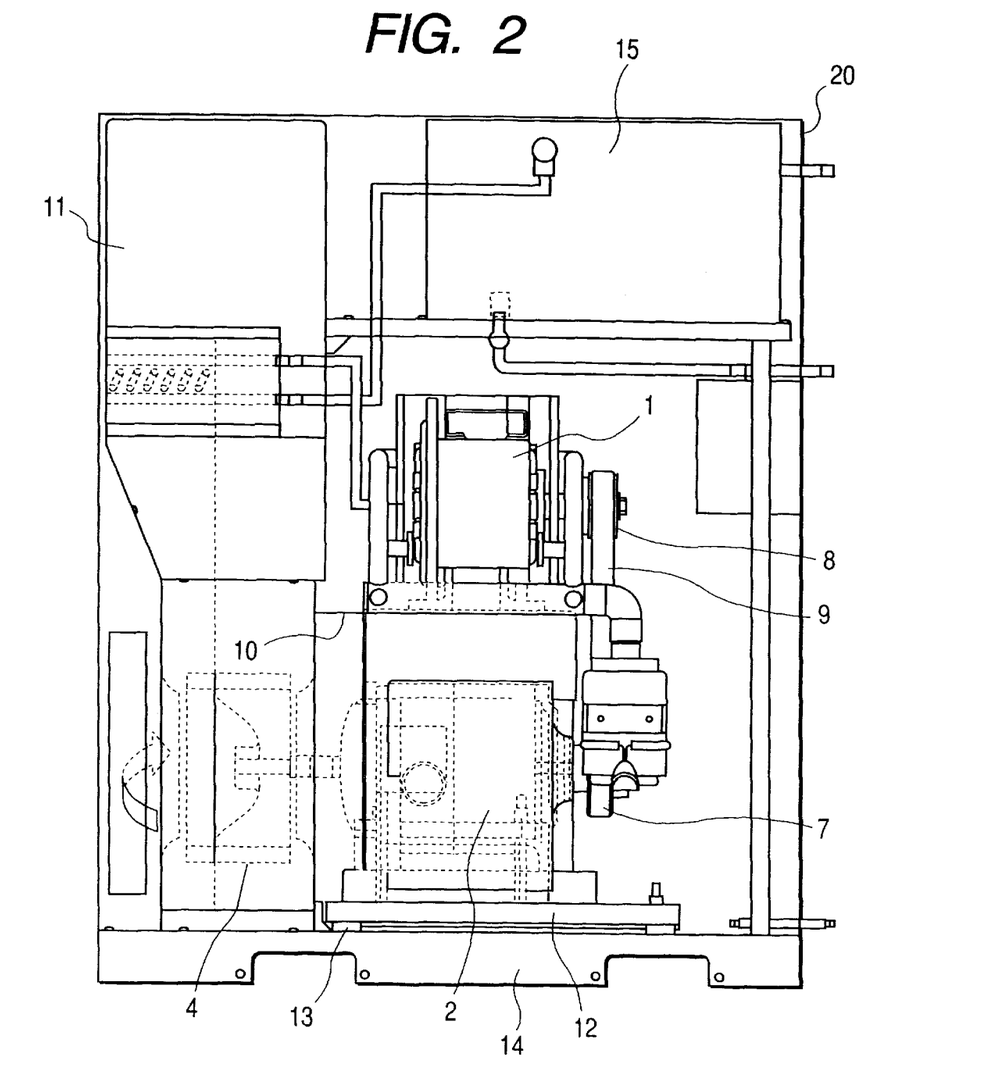
FIG. 2 is a front view of the scroll compressor shown in FIG. 1.
Figure 3:
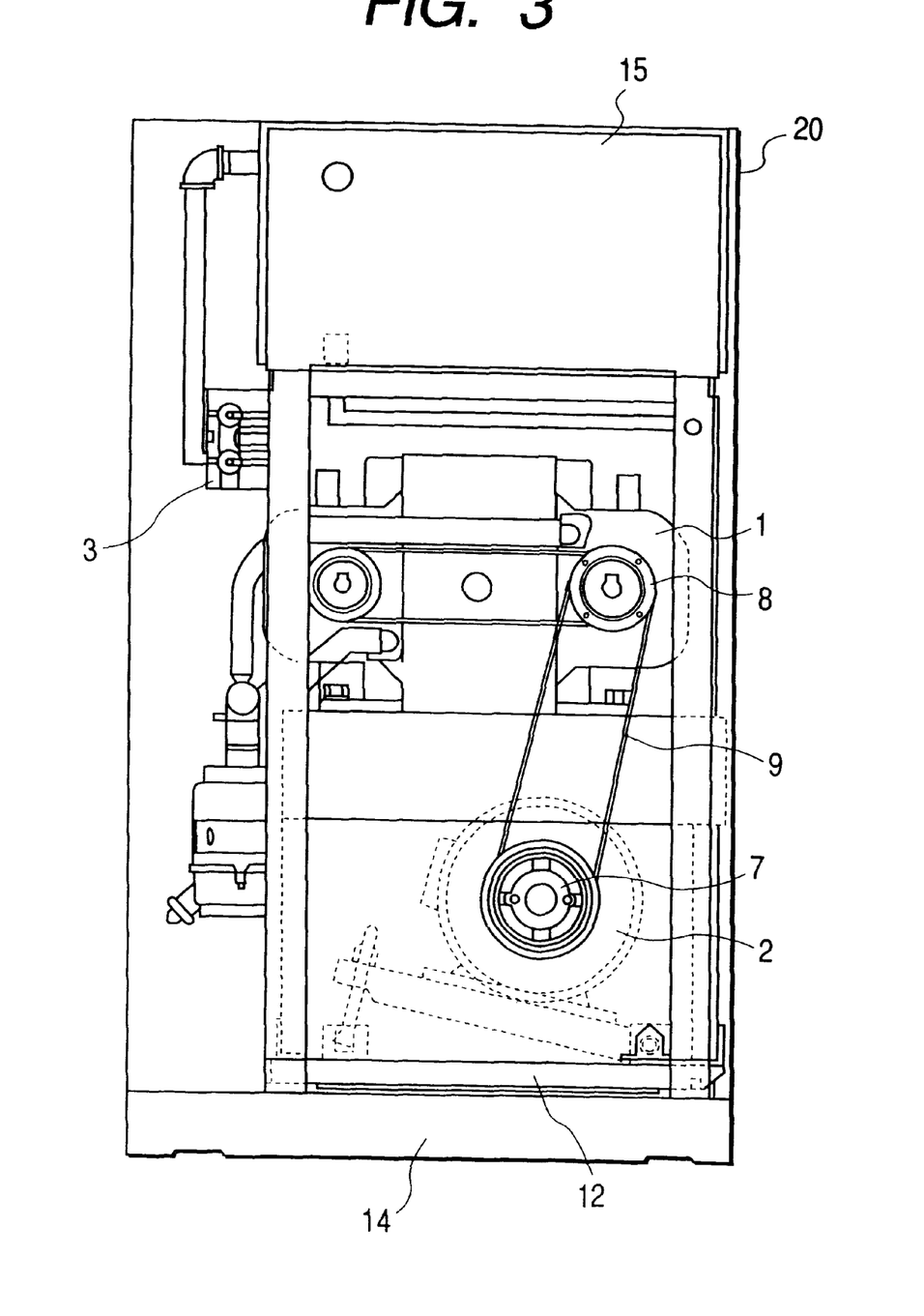
FIG. 3 is a right hand side view of FIG. 2.
Figure 4:
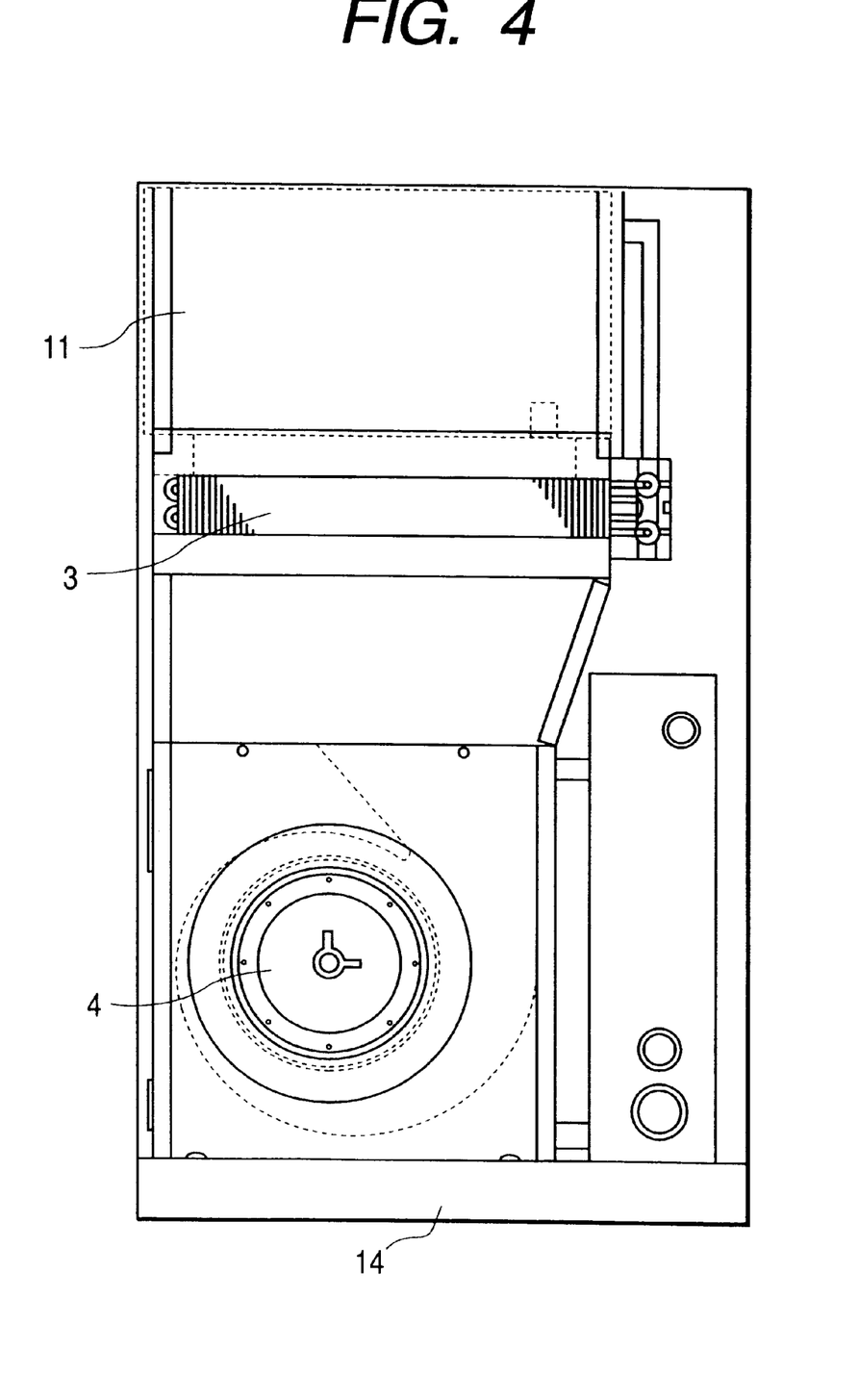
FIG. 4 is a left hand side view of FIG. 2.

Hereinafter, a preferred embodiment of the present invention will be explained with reference to FIGS. 1 to 7. FIG. 1 shows an air flow inside of the oil-free compressor according to a preferred embodiment of the present invention. FIGS. 2 to 4 are a front view and right and left side views of the oil-free scroll compressor, respectively. An inside of the casing is shown in FIGS. 2 to 4 removed the panels comprising the casing.

Referring to FIG. 1, reference numeral 1 denotes a compressor element, reference numeral 1a denotes a cooling air outlet of the compressor element 1, and reference numeral 2 denotes a double-end motor equipped with a cooling fan 4 on its shaft on one of the sides and with an M-sheave 7 for driving the compressor element on its shaft on the other side. The motor 2 and the compressor element 1 are disposed on respective stages of a motor base 13, which is constituted into two stages. The motor base 12 is installed on a common base through a vibration-isolation rubber mounting 13 so as to insulate with respect to the vibration of the common base 14.

A V-pulley 8 is fitted to the compressor element 1, and the driving force of the double-end motor 2 is transmitted to a rotary shaft 2a of the compressor element 1 through the V belt. An exhaust duct 11 is formed substantially vertically on the discharge side of the cooling fan 4, and a fin tube type cooler 3 is disposed inside this exhaust duct 11, and above the cooling fan 4. The cooling fan 4 can suck the air from both sides 4a, 4b. A duct 10 is formed on one of the suction side of the cooling fan 4 to cool both the compressor element 1 and the double-end motor 4 and located substantially in parallel with the double-end motor shaft.

A duct equipped with a partition wall 11a is interposed between one of the sides of the duct 10 and the exhaust duct 11 so as to prevent the air flowing into one of the suction side 4a of the cooling fan 4 from mixing with the air flowing out from the cooling fan 4. On the other hand, the other end of the duct 10 is connected to a fin cover disposed on both sides of the fin 21 so that the cooling air flowing through the compressor element 1 is guided to the cooling fan 4.

The cooling air flowing through the casing 20 is sucked from the other suction side 4b of the cooling fan 4 formed bell-mouth like, and cools the cooler 3 after flowing through the cooling fan 4. A partitioning means 24a protruding to the cooler is disposed near the cooling fan 4 so as to prevent the air passed the compressor element 1 and the motor 2 from mixing with an external air sucked from one of the suction side 4b of the cooling fan. Therefore, since the cooling air slightly warmed in the casing compared with the outside air cools the cooler 3, a temperature difference between the cooling air and the operation gas flowing inside of the cooler 3 can be large, and an efficiency of the heat exchange in the cooler 3 can be improved.

The compressor element 1 is connected to the cooler 3 by a conduit 5, and the cooler 3 and a dryer 15 disposed above the compressor element 1 are connected by a conduit 6. That is, high pressure and high temperature air compressed by the oil-free scroll compressor is subjected to heat-exchange by the cooler 3 with the external air and is cooled to air at not higher than 55° C.

The dryer 15 constitutes a refrigeration cycle which comprises a compressor element 15a, a condenser 15d, a capillary 15c, an evaporator 15b, and a fan 15e delivering the air to the condenser 15d. The inflow temperature of the dryer 15 is limited to less than 55° C. Therefore, since the discharge gas of the compressor is pre-cooled by the cooler 3, the dryer 15 can be operated at a suitable temperature.

Reference numeral 20 denotes a casing for accommodating the compressor unit as a whole. A dryer suction port 17 is disposed on the upper right side surface of the casing 20 and a suction port 16 is disposed on the middle right side surface of the casing 20 nearly even level of the compressor element 1. A dryer exhaust port 18 and an exhaust port 19 are disposed at the upper part of the casing 20. A suction port 11c to intake an outside air for cooling the cooler 3 is disposed on the lower left side surface of the casing 20 nearly even level of the cooling fan 4. Then, the level of the suction port 11C is lower than that of the suction port 16.

The air flow for cooling the compressor element 1 and the cooler 3 in the package-type scroll compressor according to the present invention having the construction described above will be explained.

When the double-end motor 2 is turned on, the cooling fan 4 rotates simultaneously with the double-end motor 2, and cooling air is sucked into the casing 20 from the suction port 16 formed on the right side surface of the casing 20. The external air sucked into the casing cools the compressor element 1 disposed in the proximity of the suction port 16, then the double-end motor 2. Fins 21 are formed on both side surfaces of the compressor element 1. A portion of cooling air flowing from the suction port 16 flows through the side of portions of the compressor element 1 while the fins 21 work as a guide.

Other portion of the cooling air flows through cooling holes formed in an end plate of an orbiting scroll and passages communicated to the cooling holes formed in a filter cools a central portion of the compressor element that is the hottest in the package-type scroll compressor. Then, cooling air passes through the cooling air discharge port 1A formed at the lower portion of the compressor element 1, and flows in the axial direction through the peripheral portion of the double-end motor 2 to the duct 10. The cooling air flown into the duct 10 is sucked by the cooling fan 4 through the flow path partitioned by the partitioning wall 11A and the suction side 4A of the cooling fan 4.

Other portion of the external air sucked from the suction port 16 flows into the duct 10 from the suction port 2A of the double-end motor 2 through a proximity of a pulley fixed to the compressor element 1. Then, the external gas is sucked by the cooling fan with mixing the cooling air after cooling the compressor element 1. Therefore, a portion of the cooling air sucked into the casing 20 flows into the cooling fan 4 through the duct 10 after cooling the compressor element 1. Other portion of the cooling air flows into the cooling fan through the double-end motor 2. The cooling air passed the cooling fan 4 is conducted to an exhaust port 19.

The most part of the remaining cooling air sucked from the suction port 16 cools inside of the casing 20. Then, the cooling air flows into a suction space 26 defined by the casing 20 and partitioning means 11B from a suction port 11C through a peripheral of a partitioning means 24A that forms the duct 10 and a first cooling passage. Sucked by the cooling fan 4, the cooling air cools the cooler 3 passing through a second cooling passage. This gas is exhausted to outside from the exhaust port 19, after mixing with the cooling gas passing the first cooling passage. That is, there is a space that communicates the suction space 26 and detours the first and the second cooling passage 24, 25 in front of the motor shown in FIG. 1. The cooling air flowing through an inside of the casing 20 flows into the suction port 11C of the suction space 26 from the above-mentioned space.

Suction partitioning means 11B has a bell-mouth like discharge port 11D that opens to the cooling fan side. Therefore, the cooling air is conducted to the cooling fan that is a centrifugal fan with low resistance. A control device that is not shown in the drawings is provided in front of the cooling fan 4, and controls the package-type compressor. As the cooling air for supplying to the second cooling passage is sucked behind the control device and the control device which has a high heat flux semiconductor device is cooled by the cooling air, the control device can be operated with stable.

Incidentally, there is no bad influence to cool the cooler 3, because temperature rise of the cooling air is a little, even if this control device is cooled. The flow rates of the first cooling passage and the second cooling passage are decided by the position of the partitioning means 24A. In this embodiment, the length of a shaft of the cooling fan 4 is 155 mm, and the partitioning means 24A is apart from the motor 2 by 120 mm. In addition, according to this embodiment, since the air is sucked from the suction port 16 to the second passage and there are few openings in the casing 20, the operation noise can be reduced.

Figure 5:
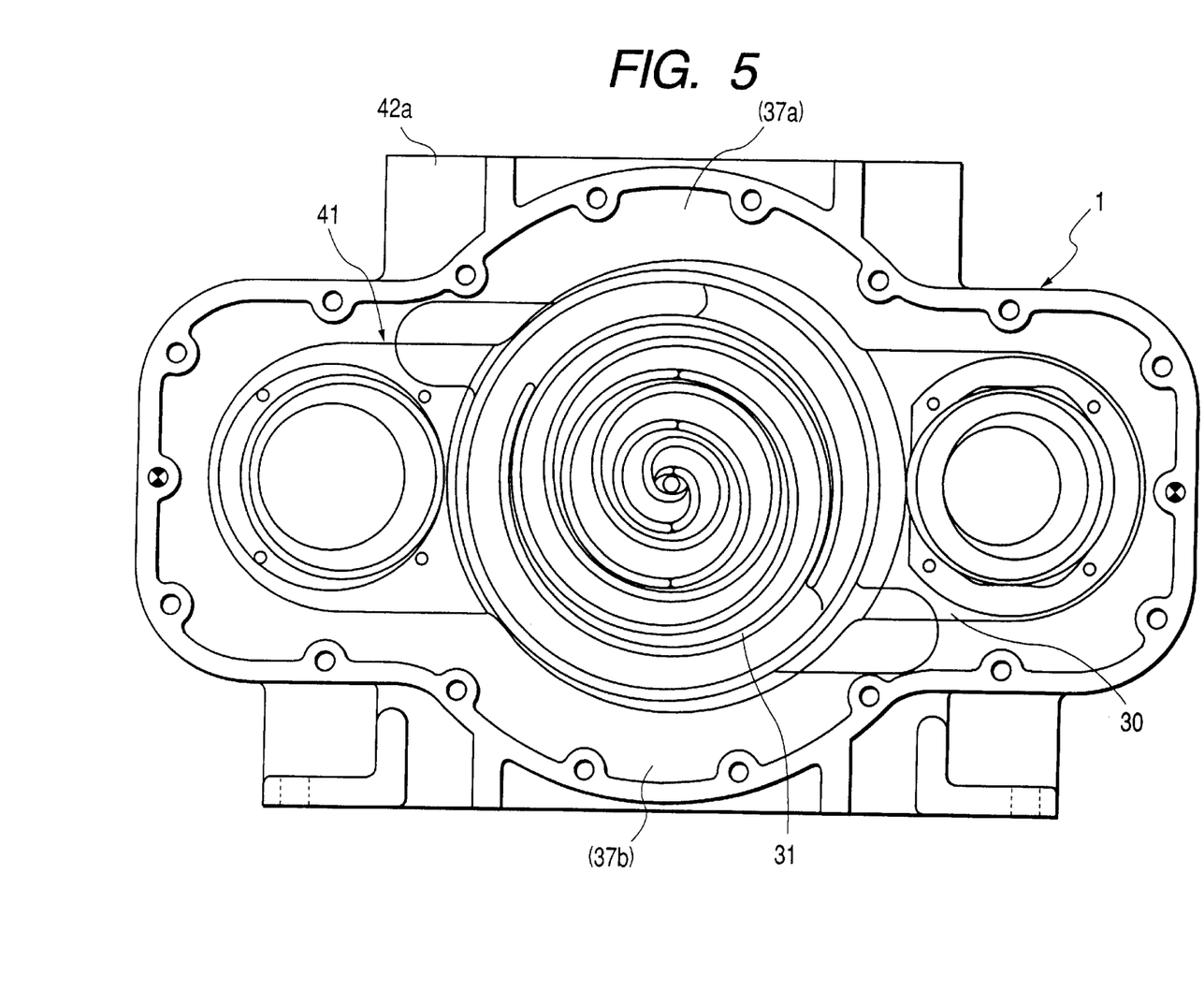
FIG. 5 is a longitudinal sectional view of an example of the scroll compressor element for the embodiment shown in FIGS. 1 to 4.
Figure 6:
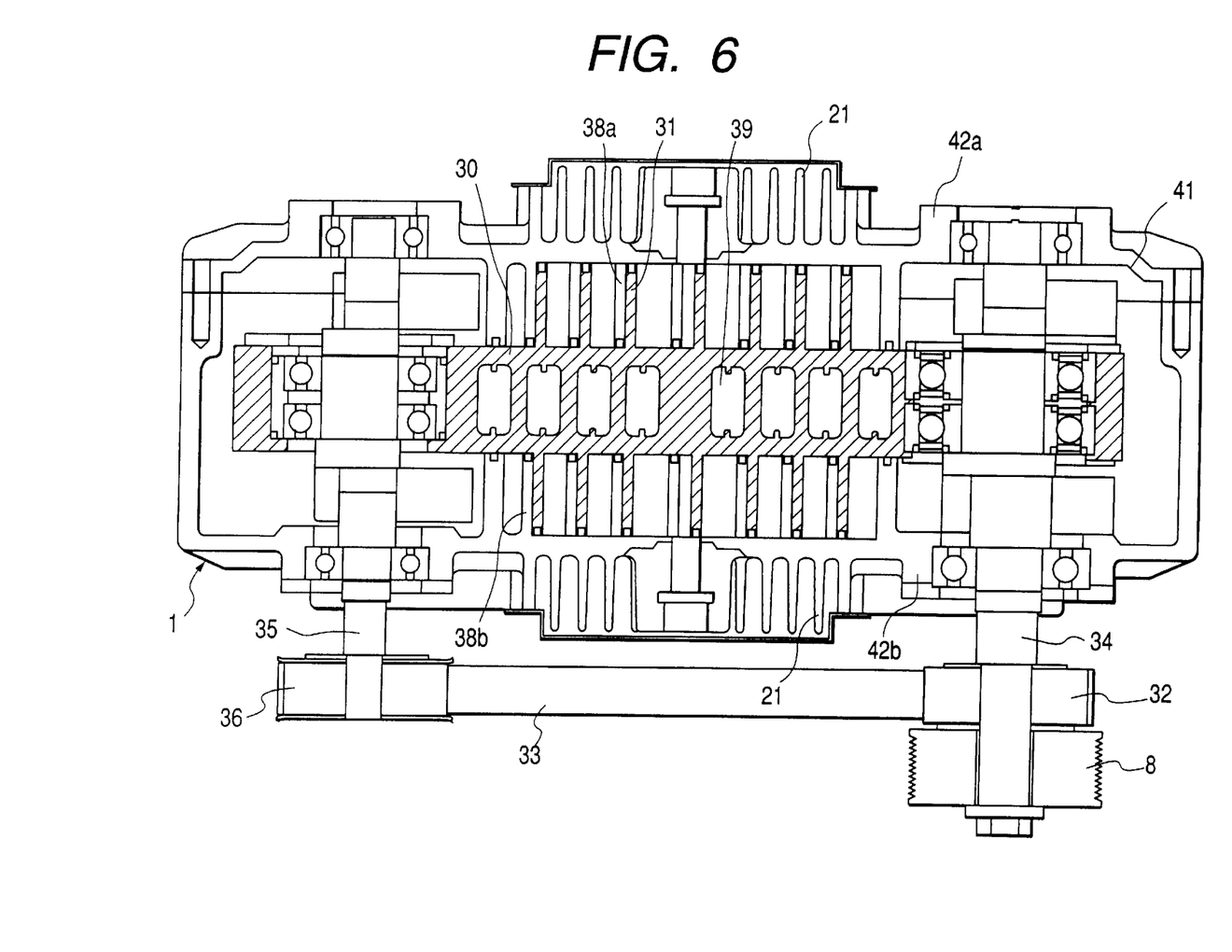
FIG. 6 is a transverse sectional view of the scroll compressor element shown in FIG. 5.
Figure 7:
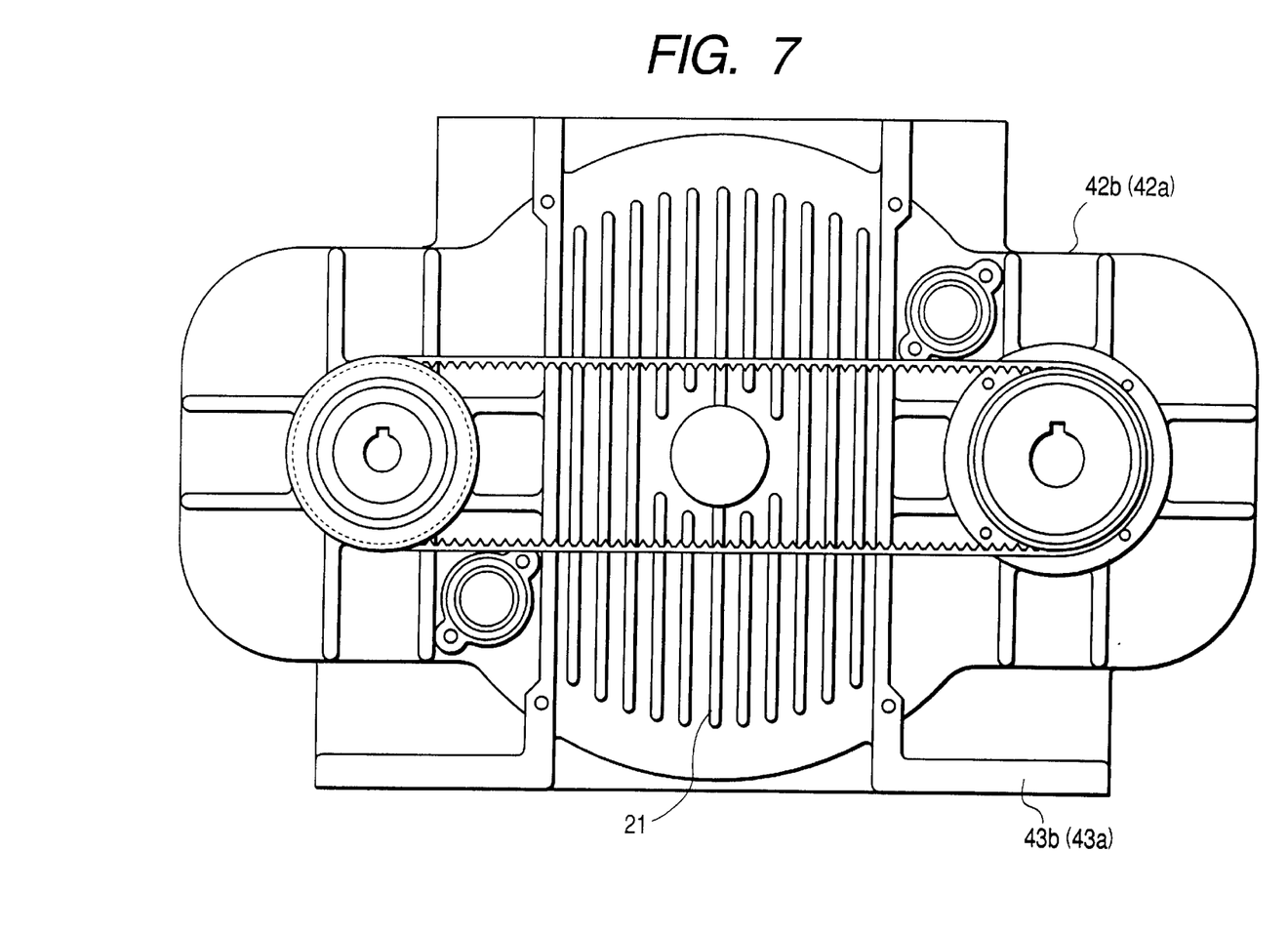
FIG. 7 is a side view of an example of the stationary scroll used for the scroll compressor element shown in FIG. 6.

Details of the double scroll compressor element 1 will be explained with reference to FIGS. 5 to 7. FIG. 5 is a transverse sectional view of the compressor element of the package-type scroll compressor shown in FIG. 1. FIGS. 6 and 7 are a longitudinal sectional view of the package-type scroll compressor and a side view of the stationary scroll shown in FIG. 5, respectively. Spiral laps 31 are formed at both front and back surfaces of an end plate 30 of the orbiting scroll 41.

This orbiting scroll 41 is put between the stationary scrolls 42A, 42B which have spiral laps 38A, 38B.

Driving force is transmitted from the double-end motor 2 to a main crank shaft 34 through a pulley 8, then the driving force is transmitted to a auxiliary crank shaft 35 through timing pulleys 32, 36 and a timing belt 33 transmitting the driving force between the timing pulleys. These two crank shafts are supported by bearings in the peripheral portion of the end plate of the orbiting scroll where laps are not formed, and are also supported rotatably by bearings at predetermined positions of the stationary scrolls 42A, 42B. A fluid suction port is provided to the stationary scroll while a discharge port is disposed at the central portion of the stationary scroll in such a manner as to correspond to the laps at the peripheral portions of the stationary scroll and the orbiting scroll.

When driving force is transmitted from the double-end motor to the pulley, the crank shaft 34 rotates, and the auxiliary crank shaft 35, too, rotates in synchronism with the main crank shaft 34 through a timing pulley 32 and a timing belt 33 for synchronization. Due to this rotation, the orbiting scroll rotates with a predetermined radius without turning on its own axis.

In consequence, the gas is sucked from the suction port into the compression chamber defined by the orbiting scroll and the laps of the two stationary scrolls. As the rotation of the orbiting scroll proceeds and the compression chamber moves from the peripheral portion of the end plate to the center portion, the gas reaches a predetermined pressure and is then discharged from the discharge port. During this compression process, the temperature of the operation gas rises and the temperature rise is remarkable particularly at its center portion, which should be cooled.

As shown in FIGS. 6 and 7, because the timing pulleys are fitted to the crank shaft in the proximity of both end portions of the compressor element, there is no space, but a sufficient space can be secured at the center exclusive of the discharge port of the compressor. Therefore, the cooling fins are formed at this portion.

Because the rotary shaft of the double-end motor and the crank shaft are in parallel with each other for the sake of convenience of power transmission, the longitudinal direction of the fins 21 is set to a direction which is perpendicular to both the axis of rotation of the double-end motor and a straight line connecting the axes of the crank shafts.

The height of the fins 21 from the casing outer wall of the compressor element 1 is set to a predetermined height in consideration of both of the fluid resistance and the heat radiation capacity. The pitches between the fins 21 are also determined similarly. It is the discharge port portion that is the highest temperature in the package-type compressor, as described above. Then, the cooling passage is formed in the proximity of the discharge port, as near as possible.

Several cooling through-holes 39 are formed in the direction which is perpendicular to both a straight line connecting the axes of the crank shafts 34, 35 and a straight line connecting the center of the axes of the crank shafts 34, 35, in FIG. 6. These cooling holes 39 are the rectangular passages that formed fins inside of the holes.

Because the orbiting scroll 41 also moves to the right and left direction of FIG. 6 by orbiting motion, the width of the longitudinal direction of the cooling passages are determined also in consideration of a displacement by this orbiting motion.

Incidentally, compressor cooling passages 37A and 37B that are communicated to the cooling holes 39 formed in this orbiting scroll 41 are formed at the upper part and the lower part of the stationary scrolls 42A and 42B in FIG. 6. In addition, while it is not illustrated, a filter means is installed on the stationary scrolls 42A and 42B. The cooling air is conducted to the cooling holes 39 or cooling fins 21, and it flows downward from top to bottom, in FIGS. 5 and 7.

The cooling air flows from a hole formed between the flanges 43A and 43B for installing the stationary scrolls and a cooling passage formed between the fins 21 through the cooling air discharge port 1A, then cools the motor 2. As a result the compressor element 1 can be effectively cooled, and the temperature of the orbiting scroll at the discharge portion can be dropped to 120° C.

Incidentally, it is the double-end motor 2 among the components of the double scroll compressor accommodated in the casing that has the greatest installation area. Therefore, the compressor can be made compact by defining the outer profile of the casing based on the occupied area of the double-end motor. In other words, because the pulleys and the fan are fitted to both shaft end portions of the double-end motor, the disposition of the other components is determined in such a manner as not to deviate as much as possible from the occupied area of the double-end motor inclusive of these components.

Because the motor is heavy and is likely to generate a vibration, etc., it is installed at the lower portion of the compressor. The motor is set to tilt from the horizontal plane for adjusting the tension of a belt of the motor, and the tilting angle is adjusted using a bolt shown in FIG. 3. Accordingly, a noise that occurs from the motor is reduced. While the motor base and the duct are made of separate pieces in the above embodiment, it can be one piece.

The preferred embodiments described herein are illustrative and not restrictive. The scope of the invention being indicated by the appended claims and all variations which come within the meaning of the claims are intended to be embraced therein.

According to the present invention, cooling air flows three ways, such as, in the sequence of the compressor element-motor-cooling fan, the periphery of the compressor element-motor body-cooling fan, and inside of the casing-suction space-cooling fan-cooler. Therefore, the hot air after cooled the compressor element is kept from heat exchanging with the operation gas in the cooler, temperature difference for heat exchanging in the cooler can be large. As a result, efficiency of the cooler can be improved, the mass of cooling air can be reduced, and package-type scroll compressor can be operated at a lower noise.

According to the present invention, further, the suction ports are located at the different levels of the casing side walls at fan side and at compressor element side, cold air can early be introduced to the compressor element and the cooler. In consequence, cooling efficiency of the compressor is improved.

What is claimed is:

1. A package-type scroll compressor comprising:
   a scroll compressor element having an orbiting scroll which has scroll laps on both sides of an end plate and two stationary scrolls each of which has a scroll lap meshing the scroll lap of the orbiting scroll and forming a compression chamber with the scroll lap of the orbiting scroll respectively;
   a motor for driving said scroll compressor element;
   a cooler for cooling an operation gas compressed in said scroll compressor element;
   a cooling fan disposed on one end of said motor for blasting cooling air subjected to heat-exchange with the operation gas by said cooler;
   a partition wall for partitioning a first flow passage of, the cooling air for cooling said scroll compressor element and a second flow passage of the cooling air for cooling said cooler; and
   a casing for accommodating these members.

2. A package-type scroll compressor according to claim 1, wherein said cooling fan blows cooling air to both said first flow passage and said second flow passage.

3. A package-type scroll compressor according to claim 2, further comprises suction partitioning means attached to the casing side wall at a fan side for partitioning suction space, and wherein said suction partitioning means has an first opening at a portion where said cooling fan faces, and a second opening at a different portion from the first opening for introducing a cooling air from inside of said casing.

4. A package-type scroll compressor according to claim 2, wherein a suction port is formed for sucking cooling gas on the casing side wall opposite to a cooling fan locating side.

5. A package-type scroll compressor according to claim 2, wherein a discharge port is formed on the top surface of said casing for discharging cooling gas through said first flow passage and said second flow passage, outside of the casing.

6. A package-type scroll compressor according to claim 1, further comprises suction partitioning means attached to the casing side wall at a fan side for partitioning suction space, and wherein said suction partitioning means has an first opening at a portion where said cooling fan faces, and a second opening at a different portion from the first opening for introducing a cooling air from inside of said casing.

7. A package-type scroll compressor according to claim 1, wherein a suction port is formed for sucking cooling gas on the casing side wall opposite to a cooling fan locating side.

8. A package-type scroll compressor according to claim 1, wherein a discharge port is formed on the top surface of said casing for discharging cooling gas through said first flow passage and said second flow passage, outside of the casing.

9. A package-type scroll compressor according to claim 1, further comprises a dryer disposed above said compressor element, and wherein a suction port is formed on a side wall of said casing which faces to said dryer, a discharge port is formed on a top wall of said casing, and an external air is sucked from the suction port and is discharged from the discharge port to outside of said casing.

10. A package-type scroll compressor comprising:

a scroll compressor element having an orbiting scroll which has scroll wraps on both sides of an end plate and two stationary scrolls each of which has a scroll wrap meshing the scroll wrap of the orbiting scroll and forming a compression chamber with the scroll wrap of the orbiting scroll respectively;

a motor for driving said scroll compressor element;

a cooler for cooling an operation gas compressed in said scroll compressor element;

a cooling fan disposed on one end of said motor for blasting cooling air subjected to heat-exchange with the operation gas by said cooler;

a dryer for drying the operation gas cooled in said cooler; and a casing for accommodating these members;

wherein said scroll compressor element is disposed above said motor, said dryer is disposed further above said scroll compressor element, through-holes for cooling are formed in the end plate of said orbiting scroll, cooling passages for cooling said scroll compressor element communicating the through-holes are formed in said scroll compressor element, and the cooling passages are arranged vertically;

further comprising suction partitioning means for partitioning a suction space where a cooling gas for said cooling fan is sucked, and wherein said partitioning means is located in a proximity of an axial end of said cooling fan and is connected with said casing.

11. A package-type scroll compressor comprising:

a scroll compressor element having an orbiting scroll and two stationary scrolls;

a motor for driving said scroll compressor element;

a cooler for cooling an operation gas compressed in said scroll compressor element;

a cooling fan driven by said motor for blasting cooling air to said cooler; and a casing for accommodating these members, wherein partitioning means which separates a first flow passage for cooling said scroll compressor element and said motor and a second flow passage for cooling said cooler is disposed between said cooler and said cooling fan.

12. A package-type scroll compressor comprising:

a scroll compressor element having an orbiting scroll and two stationary scrolls;

a motor for driving said scroll compressor element;

a cooler for cooling an operation gas compressed in said scroll compressor element;

a cooling fan disposed on said motor for blasting cooling air to said cooler; and a casing for accommodating these members, wherein an air intake is formed at a casing side wall which locates on an extending point of said scroll compressor element, a suction partitioning means which parts suction space of said cooling fan is disposed on the casing wall opposed to the air intake, the suction partitioning means has a cooling air intake from which air conducted from said cooling fan is sucked, and the cooling air intake is lower than the air intake.

* * * * *